United States Patent [19]

Scott

[11] 4,155,249

[45] May 22, 1979

[54] THERMAL-AEROSOL GENERATORS

[76] Inventor: Forrest G. Scott, P.O. Box 246, Auburn, Ind. 46706

[21] Appl. No.: 797,457

[22] Filed: May 16, 1977

[51] Int. Cl.$^2$ ............................................. G01M 3/20
[52] U.S. Cl. ...................................... 73/40.7; 239/129
[58] Field of Search ......................... 73/40.7; 252/305; 340/239 R; 239/129

[56] References Cited

U.S. PATENT DOCUMENTS

| 3,244,641 | 4/1966 | Durr et al. | 239/129 |
| 3,361,547 | 1/1968 | Packo | 73/40.7 |
| 3,483,735 | 12/1969 | Packo | 73/40.7 |
| 3,607,780 | 9/1971 | Scott | 239/129 |

FOREIGN PATENT DOCUMENTS 1189652  4/1970  United Kingdom ..................... 73/40.7

Primary Examiner—Stephen A. Kreitman
Attorney, Agent, or Firm—Gust, Irish, Jeffers & Rickert

[57] ABSTRACT

An improvement in the implementation and employment of thermal-aerosol fog and/or smoke generating devices is disclosed wherein a pressurized source of an atomizable and/or vaporizable liquid is supplied in a visually monitorable and controllable or adjustable manner to an improved exhaust gas manifold wherein the liquid is mixed with and atomized and/or vaporized by the hot exhaust gases and thereafter supplied to a blower outlet area for dispersion. The thermal-aerosol generator allows the quick replacement of the pressurized liquid source when a liquid-gas interface is first observed, wherein the new pressurized liquid source may be clamped to the generator and flow therefrom commenced prior to the remaining liquid from the previous container having been exhausted, thereby providing a substantially continuous controllable fog and/or smoke flow despite replacement of the liquid source. In a preferred use, the generator detects openings in regions by introducing the fog and/or smoke generated by atomizing and/or vaporizing a relatively low viscosity, high boiling point liquid petroleum hydrocarbon and introducing that atomized and/or vaporized material into a flow of cooler ambient air to be inserted into the region whereafter the fog and/or smoke emanating from region openings may be observed.

9 Claims, 5 Drawing Figures

THERMAL-AEROSOL GENERATORS

BACKGROUND OF THE INVENTION

The present invention relates generally to thermal-aerosol generating methods and apparatus and more particularly to the structure and use of an improved thermal-aerosol generator having a quick change pressurized fog and/or smoke producing material container and to a method of employing such a thermal-aerosol generator to test for openings in regions such as sewers, pipes or boilers and similar conduits or containers, including new sewer line construction before backfilling.

The infiltration of unwanted surface and storm water into sewers and particularly sanitary sewer systems is costly with one estimate being that at least 15 percent of the total capacity of the sanitary sewer systems nationwide is lost due to the presence and infiltration of such surface and storm water which, once introduced into the sanitary sewer system, must be processed with the normal sanitary sewage. A substantial cost savings is available by eliminating such surface water infiltration and an economical and effective process for locating, determining and/or pinpointing the points of inflow or infiltration of such surface or storm water, followed by the elimination of such inflow or infiltration points is highly desirable. With the advent of Federal legislation limiting the ingress of surface and/or storm run-off water into sanitary sewage treatment systems, this locating, determining, pinpointing and eliminating of such points has become essential. Over 60 percent of such surface water intrusion occurs through laterals and house plumbing. Smoke tests reveal the following faults:

(1) Leaks permitting surface infiltration;
(2) Connected roof and cellar drains;
(3) Connected sanitary and storm sewers;
(4) All connected lines, including abandoned and supposedly unconnected lines;
(5) Leaky manholes;
(6) Uncapped lines;
(7) Lost manholes;
(8) Unmetered connections where meters are required;
(9) Rodent passages leading into lines.

The smoke-testing of sanitary sewers to locate illegal inflow or infiltration has been attempted but with little real degree of completeness or total sucess of such operations.

To perform such a smoke-test, a section or region of the sanitary sewer or the like is isolated, for example, by placing bags of sand or small rocks or other obstructions or inflatable plugs at two or more locations to isolate the region. A somewhat centrally located sanitary sewer or the like manhole cover is removed and replaced by an apertured piece of plywood or the like and the smoke is introduced through the aperture to the system, and points at which that smoke escapes are identified for corrective action, if necessary. A partially filled innertube, tire flap or other sealing device is sometimes employed intermediate the plywood and pavement or other surface for sealing purposes.

The actual smoke generation is accomplished by placing a smoke candle or smoke bomb at the intake of a small portable blower, the output of which is coupled to the plywood aperture. Typically, several such smoke bombs are required to adequately test a reasonable size sewer region. The emergence of smoke from a residential vent pipe for example, is normal and does not indicate an illegal connection, however, smoke rising from residential downspouts or outside drains and catch basins does indicate an illegal connection which in the aggregate can be highly detrimental to the sanitary sewage system capacity.

Other attempts to identify improper water inlets to such systems have included the closed circuit television inspection or even photographing of the pipe interior as well as low pressure air testing, where a region is pressurized slightly, and the time rate of decrease of that pressure measured to determine the amount but not the location of improper openings. Also the flow rate of water throughout the system may be monitored to determine where excess flows exist.

It is also known in the prior art, as exemplified by my prior U.S. Pat. No. 3,607,780, to generate a voluminous fog and/or smoke by thermal-aerosol principles. In the device of my patent, an insecticide, riot control agent including smoke or other fog and/or smoke producing material, is supplied to an exhaust manifold and mixed with and atomized and vaporized by the exhaust gases emanating from an internal combustion engine, and the atomized and vaporized material-exhaust gas mixture is conduited to the output of a blower driven by the same engine so as to disperse the agent as a fog and/or smoke. Such a thermal-aerosol approach does not employ pyrotechnic devices, such as smoke bombs or smoke candles thereby minimizing any danger from fire and explosion, and as compared to a smoke bomb or smoke candle approach, minimizes the exposure of the machine to the fog or smoke producing agent by introducing that fog and/or smoke product at the blower outlet, rather than the blower inlet, as with, for example, a smoke bomb. Further, while a smoke bomb must be allowed to run or burn its course, extremely short applications of fog and/or smoke are available from a thermal-aerosol generator, and for extremely long applications of smoke, several smoke bombs are required, while only one or at most just a very few canisters of fog and/or smoke producing material are required with a thermal-aerosol generator. About a dozen commercially available smoke bombs are required to equal the volume and density of smoke or fog available from a single container according to the present invention. A smoke bomb and the prior art thermal-aerosol generators provide an interrupted flow of smoke or fog when such sources are changed, however, with the present invention, as will appear more clearly subsequently, an uninterrupted flow of fog and/or smoke of controllable density and volume is possible. It should also be noted that the materials used in smoke bombs and smoke candles create a smoke which is at least somewhat toxic and at least somewhat corrosive.

SUMMARY OF THE INVENTION

Among the several objects of this invention may be noted the provision of a fog and/or smoke generating method and apparatus for identifying openings in regions; the provision of a non-toxic, non-caustic or non-corrosive improved fog and/or smoke generating apparatus of the thermal-aerosol type; the provision of a method and apparatus for providing a substantially continuous flow of fog and/or smoke product while changing from an expended source to a new source of fog and/or smoke producing material; the provision of a manifold arrangement for a thermal-aerosol generator characterized by its economy of manufacture and ease of installation and removal; and the provision of an improved thermal-aerosol generating arrangement employing a nearly constant pressure fog and/or smoke producing agent source.

In general, and in one form of the invention, a sustained and controlled density flow of fog and/or smoke from a thermal-aerosol generator, where liquid material is introduced into an internal combustion engine exhaust system, includes monitoring the flow of liquid material from a pressurized container to and through an adjustable metering valve to the exhaust system and detecting the occurrence of a liquid-gas interface in that monitored flow, whereupon the pressurized container is replaced with a new pressurized liquid container and liquid material supplied therefrom to the exhaust system. Liquid flow from the new container is preferably initiated prior to the liquid material from the prior container having all been expelled from the exhaust system, and in one form of the invention, replacement includes disconnecting the prior container from the generator and threadingly and sealingly engaging the new container to enable the flow of liquid material therefrom, as well as independently clamping the new container to the generator.

Also in general, openings in a region are detected by providing a source of a preferably relatively low viscosity, high boiling point liquid petroleum hydrocarbon material, atomizing and vaporizing that material and mixing the atomized and vaporized hydrocarbon into a flow of ambient air to cool the hydrocarbon and form a flow of dense fog and/or smoke, which fog and/or smoke is introduced into the region, and fog and/or smoke emanating from region openings observed. Preferably, the hydrocarbon material is contained under pressure in a container along with a gas which is at least somewhat soluble and saturated under pressure and stabilized in the hydrocarbon liquid so that when a variable and/or controlled flow of liquid from the container occurs, gas leaves the solution to maintain the pressure within the container relatively constant. The hydrocarbon liquid may also include a residual or visible coloring material, such as a fluorescent material, or may contain other colored, coloring and/or residue and/or non-residual color producing materials to aid in locating the openings. Detection of fluorescent materials may include the use of ultraviolet or black light.

Still further in general, a thermal-aerosol generator in one form of the present invention, and constructed generally according to the teaching of my above-mentioned U.S. Patent, includes a manifold slotted on the side thereof opposite an exhaust gas inlet with that slot extending transverse to the manifold and slidingly accepting a generally flat bar for fastening the manifold to an internal combustion engine. The bar extends beyond the manifold to either side thereof and includes a pair of fastener-accepting apertures near either end and beyond the manifold sides, through which a pair of threaded fasteners may be passed, and extending along the sides of the manifold and into the engine for easily and economically connecting the manifold to the engine. The liquid source is connected to an injection opening in the downstream discharge of the exhaust manifold by a conduit having a portion thereof flexible, transparent or translucent so that the liquid may be viewed and a liquid-gas interface identified. A pressurized liquid container having a single opening including a self-sealing valve and suitable, sealing mating piece is connected to a translucent Nylon or similar suitable flexible tube in one preferred disclosed embodiment. A presealing arrangement such as an "O" ring between the container and mating piece which seals the connection before the valve is opened may also be included.

BRIEF DESCRIPTION OF THE DRAWINGS

Corresponding reference characters indicate corresponding parts throughout the several views of the drawings.

The exemplifications set out herein illustrate embodiments of the invention in one form thereof and such exemplifications are not to be construed as limiting in any manner the scope of the invention.

DESCRIPTION OF THE PREFERRED EMBODIMENTS

Figure 1:
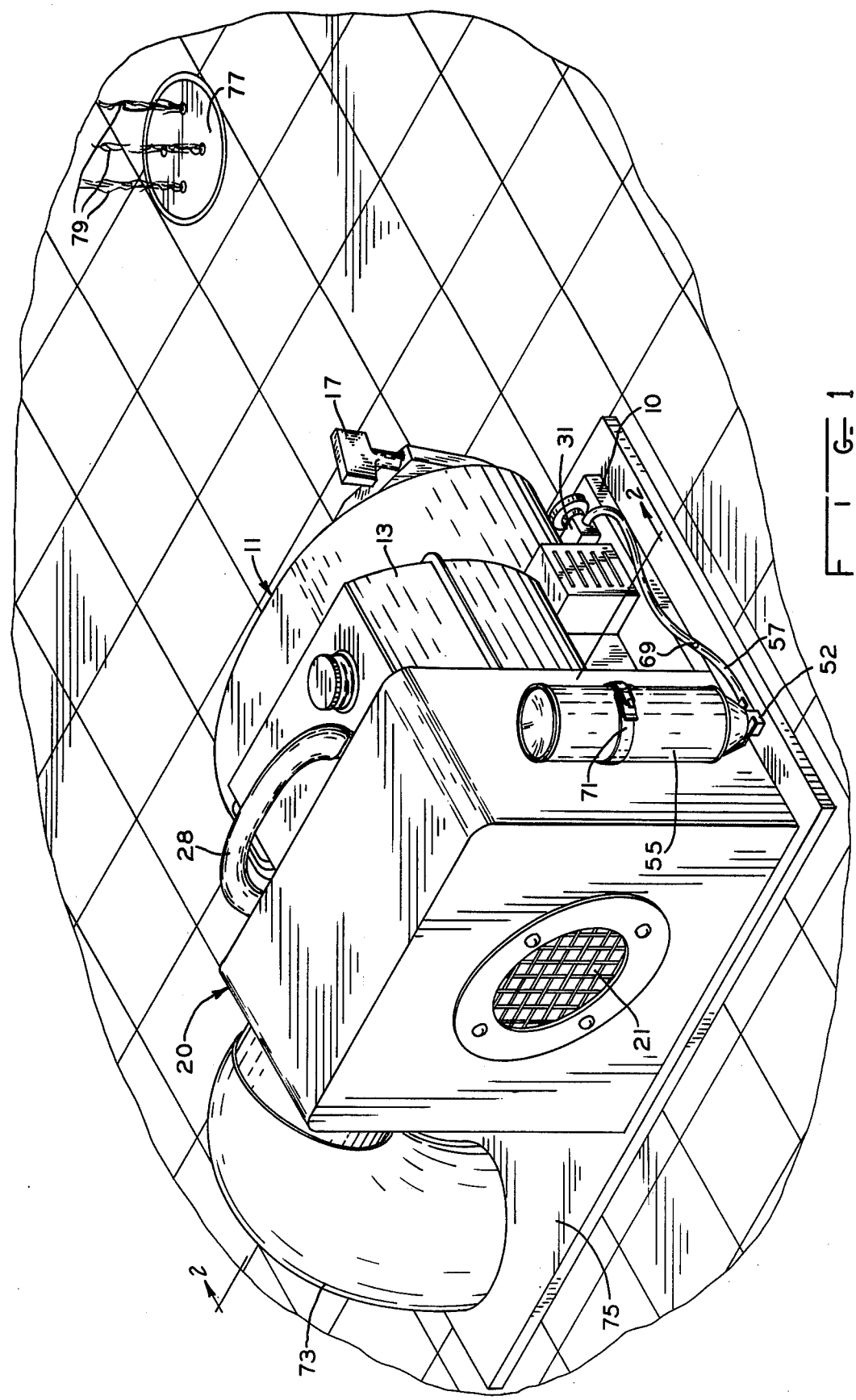
FIG. 1 is a rear perspective view of a thermal-aerosol generator employed according to the techniques of the present invention.
Figure 2:
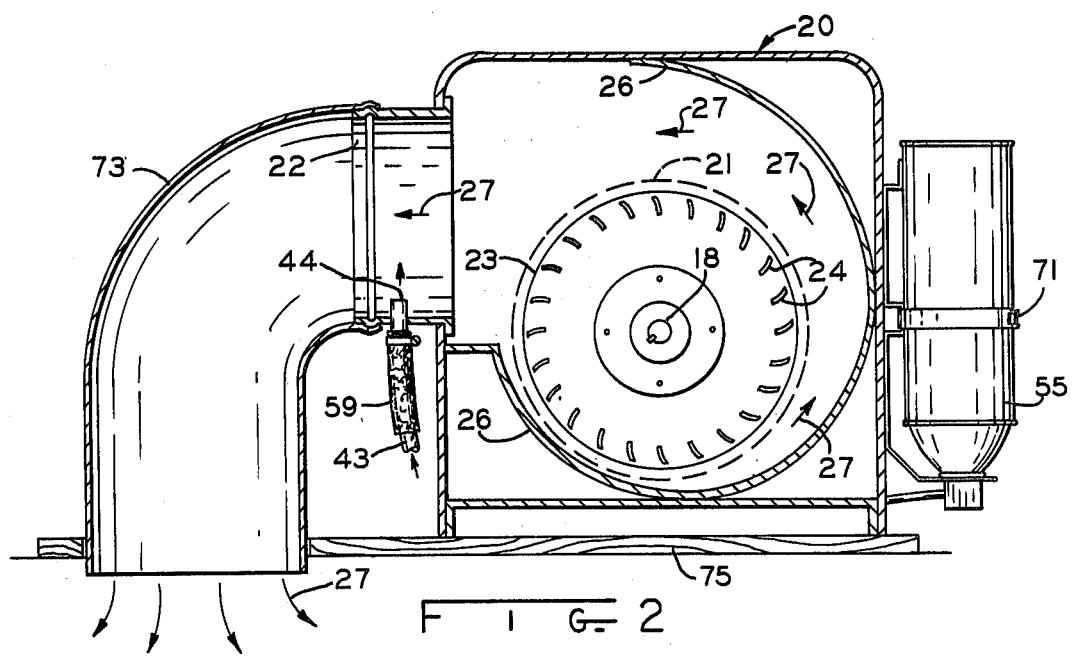
FIG. 2 is a side view of a thermal-aerosol generator partly in section illustrating the operation of the thermal-aerosol generator of FIG. 1.
Figure 4:
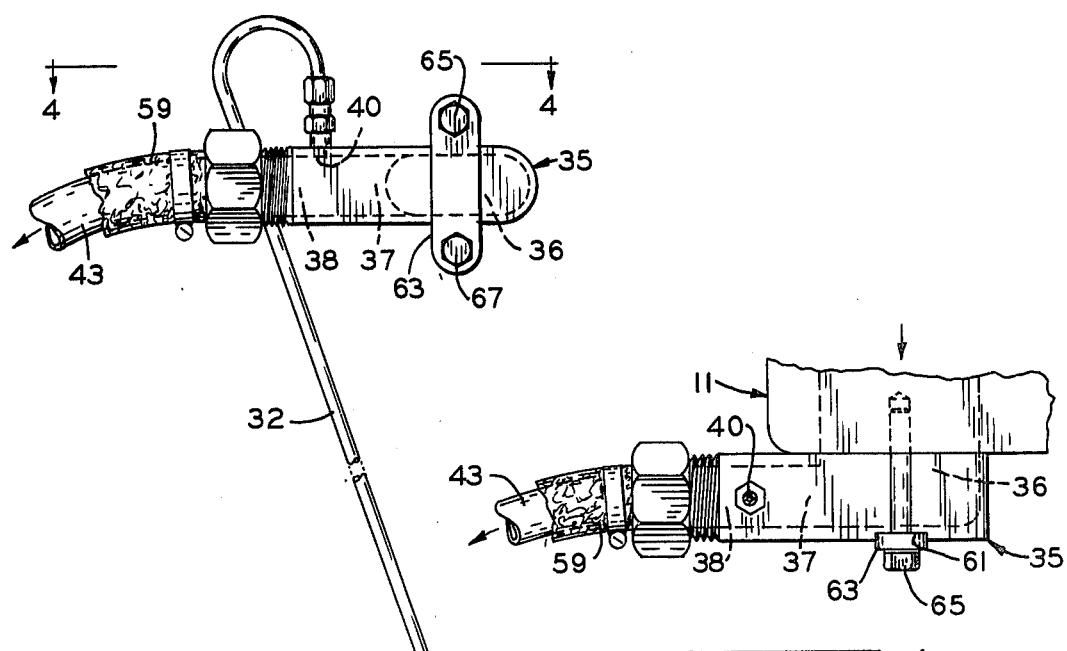
FIG. 4 is a view of the manifold of FIG. 3 in the direction of lines 4—4.
Figure 3:
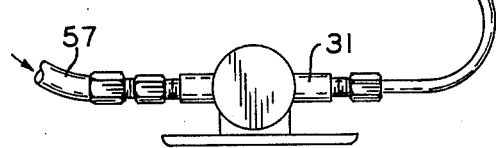
FIG. 3 is a detailed view of the manifold and metering valve used in the generator of FIGS. 1 and 2.
Figure 5:
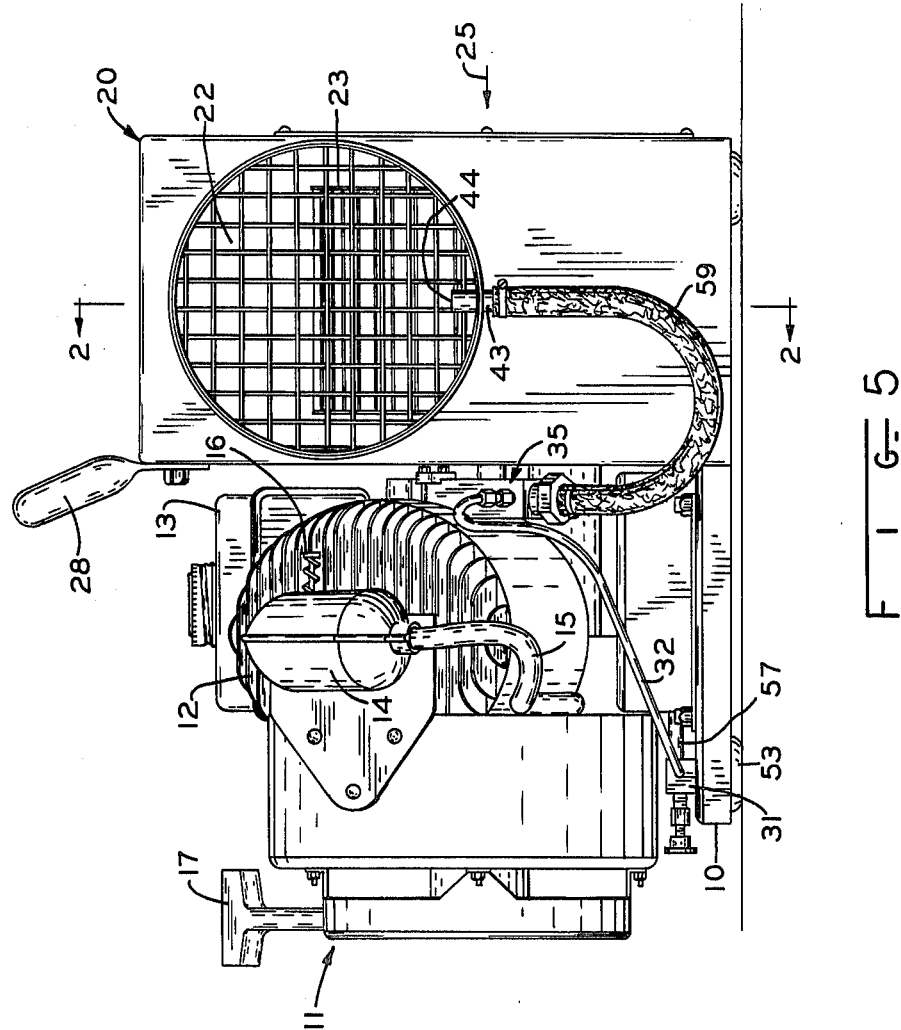
FIG. 5 is a front view of the generator of FIG. 1.

Considering first FIGS. 1, 2 and 5, the thermal-aerosol generator is mounted on a suitable base 10, so that the generator is easily portable as a single unit, and by a single person. The base 10 may be provided with suitable feet or springs 53 or other resilient shock mounting or cushioning devices so that it can be set on any desired surface and not slide or move about when in operation. A two cycle internal combustion engine 11 is mounted at one side of the base 10 and is conventional, having an operating piston reciprocable within the cylinder 12, which may be provided with suitable cooling fins, as shown. A gasoline container or tank 13 is mounted beside the engine 11 for holding a supply of gasoline or other suitable fuel. A spark plug is mounted on the cylinder 12, and covered by a shield 14 for reducing radio and television frequency interference. The spark plug is also connected by a like or similarly shielded wire 15 to a suitable ignition circuit. A spring plunger arrangement 16 is operable when depressed to short circuit the spark plug and stop the engine. With plunger 16 released, engine 11 may be started in any suitable manner, such as by handle 17 connected by a rope or recoil device to the engine flywheel. A two cycle engine is preferred since it is relatively light in weight and operates efficiently at a much higher speed than a comparable four cycle engine. Such a two cycle engine, having an exhaust stroke each revolution, provides higher exhaust heat being measured in B.T.U.'s as well as providing higher velocity exhaust discharge. In the shown and preferred embodiment this two cycle internal combustion engine is rated at three horsepower and the operating speed of 3,600 revolutions per minute, however, other horsepower ratings or sizes of engines and operational speeds may be utilized.

A squirrel cage type or centrifugal type of blower 20 is mounted on the base 10 adjacent to the engine 11, so as to be driven by the output shaft 18 of the engine 11. The blower 20 is generally enclosed in a housing made of suitable sheet metal to form a chamber, as best illustrated in FIG. 2. This chamber has an air inlet opening 21, and an air outlet opening 22, each opening preferably covered by a grill or screen to protect persons from injury by the rotating fan within the blower housing. The blower may include a circular rotor 23, having a plurality of blades 24 for drawing ambient air into the air inlet opening 21, as indicated by the arrow 25, and for discharging the air out of the air outlet opening 22, as indicated by the several air flow arrows 27 in FIG. 2. The chamber inside blower 20 may be provided with a curved member 26, which is relatively close to the rotor 23 and gradually recedes therefrom, terminating at the top of the chamber. A carrying handle 28 may be attached to the blower 20 so as to support the generator in its normal attitude when being carried.

Container 55 supplies a liquid hydrocarbon by way of conduit 57 and a controllable metering valve 31, and further conduit 32, to an inlet or injection opening 40, into passageway 37 of manifold 35. The manifold 35 also has an exhaust gas inlet opening 36 and an exhaust gas outlet opening 38, which openings are connected by the passageway and include a substantially right angle bend to aid in atomization and vaporization of the liquid. The liquid is introduced into the passageway 37, again at substantially a right angle to the direction of elongation of that passageway. A high residual exhaust heat and temperature is thereby provided. The mixture of exhaust gases and atomized and vaporized liquid is conveyed by a further conduit 43 and into an opening 44 in the stream of air emanating from the blower. This end termination may or may not be of a self-supporting design and nature. These two streams of gases again intermingle at substantially right angles. The conduit 43 may desirably and preferably should be covered with an insulating material 59 to maintain the material in conduit 43 at an elevated temperature and in a hot or heated vapor state until it is mixed with the much cooler discharge ambient air emanating from the blower.

The exhaust manifold 35 is slotted at 61 on the side opposite the exhaust gas inlet 36 with the slot 61 extending transverse to the manifold 35 and slidingly accepting a bar 63. Bar 63 is generally flat and slidingly engages the manifold 35, extending beyond the manifold to either side thereof. Bar 63 is provided with a pair of fastener-accepting apertures near either end thereof and beyond the manifold sides so that a pair of threaded fasteners, such as bolts 65 and 67, may pass through those apertures and along the sides of the manifold and into the engine. Such a slotted bar-accepting arrangement for fastening the manifold 35 to the engine 11 eliminates the need for specially cast manifolds, and instead provides an easily machined manifold, along with a separate easily fabricated part for attaching the manifold to the engine. Such a two part manifold attachment arrangement further facilitates removal of the manifold for repair, service or cleaning since bolts 65 and 67 need only be loosened sufficiently for the bar 63 to clear the slots in the manifold, whereupon the manifold may be slid out from under the bar 63 for maintenance, repair or replacement. Assembly, disassembly and servicing is further aided if the end 44 of pipe 43 is free standing in the aperture in the blower outlet as illustrated.

Conduit 57 may comprise a transparent or translucent Nylon or other suitable flexible tube or may be otherwise structured so that at least a portion thereof allows the viewing of the liquid therein. With such a flexible, translucent or transparent conduit, the flow of material from the pressurized container 55 to the exhaust system may be monitored and the occurrence of a liquid-gas interface 69 is easily detected. The pressurized container 55 contains a liquid material such as a relatively low viscosity, high boiling point liquid petroleum hydrocarbon preferably, but not necessarily, having a pour point of at least as low as zero degrees Fahrenheit. The container also contains a gas, such as carbon dioxide, nitrogen or the like, which is at least somewhat soluble pressurized, saturated and stabilized in the liquid hydrocarbon. For example, a twenty-seven liquid volume ounce container will have no more than twenty-four total liquid volume ounces of liquid hydrocarbon with the remaining three ounces comprising gas head space. The liquid fog or smoke producing agent is pressurized, saturated and stabilized to an appropriate satisfactory operating or working pressure by the introduction and solubility or solution of this carbon dioxide, nitrogen or like soluble gas into and throughout the liquid formulation by means that may consist of extreme pressure, turbulence and/or agitation, shaking or vibration, with the latter being preferred. As the liquid leaves the container, some of the gas will come out of solution to fill the increasing head space within the container. This gas coming out of solution tends to maintain the pressure within the container and therefore the liquid flow rate relatively constant until the container is emptied. Agitating the container as the liquid material flows therefrom will aid the egress of gas from the liquid and help maintain that container pressure despite the decrease in volume of liquid and correlative increase in volume of gas within the container as liquid flows therefrom. This agitating may be provided by the vibration transmitting mechanical coupling between the container and the operating or operation of the internal combustion engine.

When a liquid gas interface, such as 69, is detected, the pressurized container 55 is replaced with a new liquid containing pressurized container for supplying liquid from that new container to the exhaust system. If this replacement is initiated promptly upon detecting the occurrence of the liquid gas interface 69, and is carried out swiftly, the flow of liquid material from the new container may be initiated prior to the liquid material from the old container having all been expelled from the exhaust system, thereby providing a substantially uninterrupted fog and/or smoke flow while changing pressurized containers.

Container replacement is initiated by opening the quick release suitcase type toggle or overcenter clasp 71, which completely encircles the container, and container 55 may thereafter be unscrewed from fitting 52, either in place, or by removing the container and fitting from their bracket, since conduit 57 is preferably of a flexible nylon or other suitable material. A new container is threadingly engaged with the fitting 52 which fitting includes a central depressing pin or post with a presealing gasket or the like which opens a self-sealing valve within the container to enable the flow of liquid material from the new container to the exhaust system. The new container is then, of course, clamped to the generator by closing the clasp 71.

Returning to FIGS. 1 and 2, an opening in a region may be detected according to the present invention, by providing, for example, an elbow or flexible conduit 73, connecting the outlet 22 to an exemplary sanitary sewer or the like, by passing the conduit 73 through an opening in a relatively flat cover 75 of, for example, plywood. Thus, the atomized and/or vaporized hydrocarbon emanating from the opening 44 is mixed into the flow of cooler ambient air from the blower which cools the atomized and vaporized hydrocarbon, rapidly condensing and forming a flow of voluminous, dense fog and/or smoke product out of the generator, outwardly and/or downwardly into the sanitary sewer region or other area to be smoke tested. Openings, such as 77, having fog and/or smoke 79 emanating therefrom, will thereby be easily observed, and appropriate corrective action, if necessary, may be taken. The unit may be utilized to detect faulty joints, manhole connections and other types of leaks in new sewer construction and installation testing before actual backfilling of same is completed.

The hydrocabon liquid within container 55 may, if desired, include a coloring material which is atomized and vaporized with the hydrocarbon, mixed into the flow of ambient air and introduced into the region to aid in observing the fog and/or smoke emanating from the region opening 77. This coloring material my be a fluorescent residual material and/or may be a colored material which may or may not be deposited as a residue near the region openings and the term "fog" is intended to be generic to smokes, fogs, and the like whether colored, fluorescent, residue producing or not.

From the foregoing it is now apparent that a novel method and apparatus for generating and utilizing fog and/or smoke have been presented meeting the objects and advantageous features set out hereinbefore as well as others. Numerous modifications will readily suggest themselves to those of ordinary skill in this art and those modifications, as well as others, may be made without departing from the spirit of the invention or the scope thereof as illustrated by the claims which follow.

What is claimed is:

1. The method of detecting openings in a region comprising the steps of:
   providing a source of a relatively low viscosity, high boiling point liquid hydrocarbon material including pressure containerizing the liquid hydrocarbon material along with a gas which is somewhat soluble in the liquid, and allowing the controlled flow of liquid from the container with the gas leaving the solution to maintain the pressure within the container as the liquid leaves the container;
   vaporizing the hydrocarbon material;
   mixing the vaporized hydrocarbon into a flow of ambient air to cool the vaporized hydrocarbon and form a flow of dense fog;
   introducing the fog flow into the region; and observing fog emanating from the region openings.

2. The method of claim 1 wherein the liquid includes a coloring material which is vaporized with the hydrocarbon, mixed with the flow of ambient air, and introduced into the region to aid in observing the fog emanating from the region openings.

3. The method of claim 2 wherein the coloring material is a fluorescent material.

4. The method of claim 2 wherein a residue of coloring material is deposited near the region openings.

5. An improved thermal-aerosol generator for producing a non-lethal, voluminous fog comprising:
   a base;
   a two cycle internal combustion engine mounted on said base, said engine having an output shaft and an output exhaust;
   a blower mounted on said base near said engine, said blower having a chamber with an air inlet opening, and an air outlet opening, a shaft that is mounted for rotation in said chamber, and a rotor attached to said shaft to draw air into said air inlet opening and blow air out of said air outlet opening;
   means connecting said engine output shaft to said rotor shaft to cause said rotor shaft and rotor to rotate and blow air out of said air outlet opening when said internal combustion engine is operated;
   a pressurized source of vaporizable liquid;
   a manifold having an exhaust gas inlet opening and an exhaust gas outlet opening, said exhaust gas inlet opening and said exhaust gas outlet opening being connected to each other by a passageway having a generally right angle bend, and a liquid injection opening in said passageway closely adjacent to said bend, said opening directing the liquid at substantially right angles to the passageway;
   means fastening said manifold on said internal combustion engine so that said engine output exhaust communicates with said manifold exhaust gas inlet opening and including a generally flat bar slidingly engaging the manifold and extending beyond the manifold to either side thereof, the bar being provided with a pair of fastener-accepting apertures near either end and beyond the manifold sides, and a pair of threaded fasteners for passing through the apertures, along the sides of the manifold, and into the engine, the manifold including a transverse slot on the side thereof opposite the exhaust gas inlet to slidingly accept the bar;
   means connecting said source and said liquid injection opening; and
   means connecting said manifold exhaust outlet opening to said blower air outlet opening to provide an exhaust gas-vaporized liquid flow at substantially right angles to the blown air flow so that when the liquid is supplied to said manifold liquid injection opening, and when the internal combustion engine is operated, the hot exhaust gases of the internal combustion engine allow the flow of the liquid into said passageway to mix with the gases and to form a vapor from the liquid, and the air blown out of said blower outlet opening mixes with said formed vapor from said last-mentioned connecting means, further atomizes said formed vapor and produces a voluminous fog of air, vaporized and atomized liquid, and internal combustion engine exhaust gases.

6. The generator of claim 5 wherein the means connecting said source and said liquid injection opening includes a conduit having at least a portion thereof through which the liquid may be viewed.

7. The generator of claim 6 wherein the conduit comprises a translucent Nylon tube.

8. The generator of claim 5 wherein said vaporizable liquid source comprises a removable pressurized container having but a single opening, said opening being provided with a self-sealing valve.

9. The generator of claim 8 wherein the means connecting said source and said liquid injection opening includes a mating sealing device and a valve actuator arranged to preseal the connection to the container prior to opening the container valve.

* * * * *